(12) United States Patent
Hussmann et al.

(10) Patent No.: US 8,093,758 B2
(45) Date of Patent: Jan. 10, 2012

(54) METHOD AND APPARATUS FOR CONTROL OF INDUCTIVELY COUPLED POWER TRANSFER SYSTEMS

(75) Inventors: Stephan H Hussmann, Heide (DE); Aiguo Hu, Auckland (NZ)

(73) Assignee: Auckland Uniservices Limited, Auckland (NZ)

( * ) Notice: Subject to any disclaimer, the term of this patent is extended or adjusted under 35 U.S.C. 154(b) by 194 days.

(21) Appl. No.: 10/558,352

(22) PCT Filed: May 21, 2004

(86) PCT No.: PCT/NZ2004/000096
§ 371 (c)(1), (2), (4) Date: Nov. 20, 2006

(87) PCT Pub. No.: WO2004/105208
PCT Pub. Date: Dec. 2, 2004

(65) Prior Publication Data
US 2007/0109708 A1    May 17, 2007

(30) Foreign Application Priority Data

May 23, 2003 (NZ) ......... 526115
Nov. 27, 2003 (NZ) ......... 529869

(51) Int. Cl.
H02J 3/16 (2006.01)
(52) U.S. Cl. ........ 307/105; 307/112; 307/125; 307/127; 307/129; 307/145
(58) Field of Classification Search ........... 307/105, 307/112, 125, 127, 129, 145
See application file for complete search history.

(56) References Cited

U.S. PATENT DOCUMENTS

| 4,331,225 | A | * | 5/1982 | Bolger | 191/10 |
|---|---|---|---|---|---|
| 5,207,304 | A | * | 5/1993 | Lechner et al. | 191/10 |
| 5,293,308 | A | | 3/1994 | Boys et al. | |
| 5,428,521 | A | * | 6/1995 | Kigawa et al. | 363/22 |
| 5,450,305 | A | * | 9/1995 | Boys et al. | 363/24 |
| 5,515,041 | A | * | 5/1996 | Spillman, Jr. | 340/870.31 |
| 5,573,090 | A | * | 11/1996 | Ross | 191/10 |

(Continued)

FOREIGN PATENT DOCUMENTS

DE    19961228    6/2001
(Continued)

OTHER PUBLICATIONS

Green A. and Boys J.T., "10kHz inductively coupled power transfer-concept and control", IEE Power Electronics and Variable Speed Drives Conference, Pub 399, pp. 694-699, 1994.

(Continued)

Primary Examiner — Jared Fureman
Assistant Examiner — Adi Amrany
(74) Attorney, Agent, or Firm — Young & Thompson

(57) ABSTRACT

A power pick-up for an Inductively Coupled Power Transfer (ICPT) system is provided having a resonant pick up circuit. The natural frequency of the pick-up circuit may be varied by controlling the conductance or capacitance of a variable reactive in the resonant circuit. The load being supplied by the pick-up circuit is sensed, and the effective capacitance or inductance of the variable reactive component is controlled to vary the natural resonant frequency of the pick-up circuit to thereby control the power flow into the pick-up to satisfy the power required by the load.

48 Claims, 6 Drawing Sheets

U.S. PATENT DOCUMENTS

Figure 1:
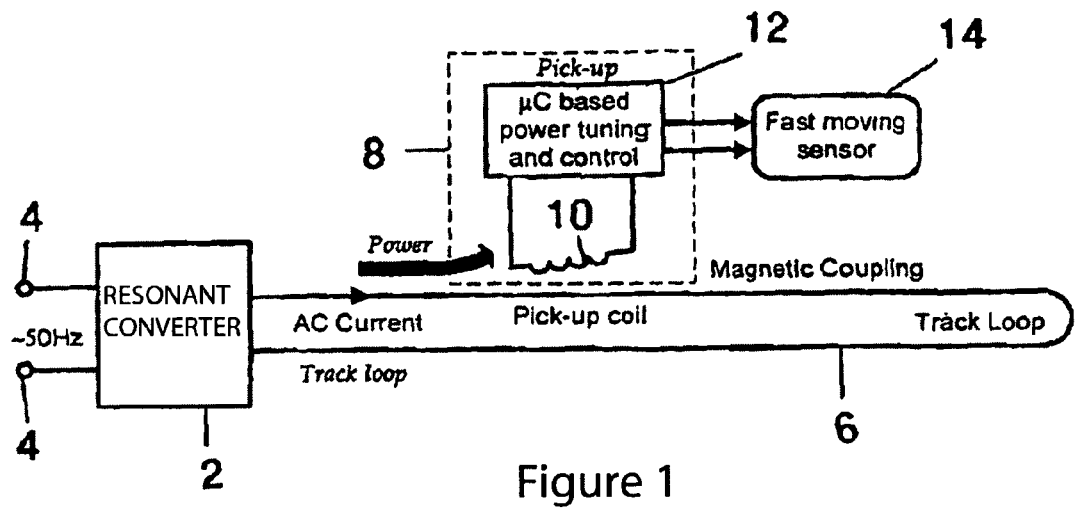

| | | | |
|---|---|---|---|
| 5,619,078 A * | 4/1997 | Boys et al. | 307/85 |
| 5,677,832 A * | 10/1997 | Tissier et al. | 363/41 |
| 5,684,678 A | 11/1997 | Barrett | |
| 5,757,099 A * | 5/1998 | Cheng et al. | 307/105 |
| 5,831,348 A | 11/1998 | Nishizawa | |
| 5,831,841 A * | 11/1998 | Nishino | 363/37 |
| 5,892,300 A | 4/1999 | Rydval | |
| 5,898,579 A | 4/1999 | Boys et al. | |
| 5,909,362 A | 6/1999 | Adams | |
| 5,953,642 A | 9/1999 | Feldtkeller et al. | |
| 6,173,899 B1 | 1/2001 | Rozin | |
| 6,385,063 B1 * | 5/2002 | Sadek et al. | 363/39 |
| 6,462,432 B1 | 10/2002 | Seelig et al. | |
| 6,515,878 B1 * | 2/2003 | Meins et al. | 363/37 |
| 6,624,743 B1 * | 9/2003 | Ikefuji et al. | 340/10.4 |
| 6,912,137 B2 * | 6/2005 | Berghegger | 363/21.03 |
| 6,952,167 B2 * | 10/2005 | Wakabayashi | 340/572.5 |
| 7,009,860 B2 * | 3/2006 | Kazutoshi | 363/98 |
| 7,176,589 B2 * | 2/2007 | Rouquette | 307/17 |
| 2003/0006880 A1 | 1/2003 | Zimmer | |
| 2003/0210106 A1 | 11/2003 | Cheng et al. | |
| 2004/0130916 A1 * | 7/2004 | Baarman | 363/21.02 |
| 2005/0083627 A1 * | 4/2005 | Wang et al. | 361/113 |

FOREIGN PATENT DOCUMENTS

| | | |
|---|---|---|
| EP | 0 609 964 | 11/1989 |
| EP | 0430358 | 6/1991 |
| GB | 2293702 | 4/1996 |
| JP | 2000-116145 | 4/2000 |
| JP | 2000116145 | 4/2000 |
| WO | WO-99/26329 | 5/1999 |
| WO | WO-01/18936 | 3/2001 |

OTHER PUBLICATIONS

European Patent Office issued an European Search Report dated Feb. 3, 2010, Application No. 04734444.5.

* cited by examiner

METHOD AND APPARATUS FOR CONTROL OF INDUCTIVELY COUPLED POWER TRANSFER SYSTEMS

CROSS REFERENCE TO PRIOR APPLICATION

This is a U.S. National Phase application under 35 U.S.C. §371 of International Patent Application No. PCT/NZ2004/000096, filed May 21, 2004, which claims priority to New Zealand Patent No. 529869, filed on Nov. 27, 2003, which claims priority to New Zealand Patent No. 526115, filed May 23, 2003. The International Application was published on Dec. 2, 2004 as WO 2004/105208 A1 under PCT Article 21(2).

FIELD OF THE INVENTION

This invention relates to Inductively Coupled Power Transfer (ICPT) systems and power pick-ups for such systems.

BACKGROUND

ICPT power systems (also known as contactless power supplies) are known to have significant advantages in applications such as the materials handling, lighting and transportation industries. There are many applications in both high and low power systems in which use of these power supplies is advantageous.

ICPT systems have a primary conductive path supplied with alternating current from a power supply. One or more secondary devices (which may be referred to as pick-ups) are provided adjacent to, but electrically isolated from, the primary path. The pick-ups have a pick-up coil in which a voltage is induced by the magnetic field associated with the primary path, and supply a load such as an electric motor, a light, or a sensor for example. The pick-up coil is usually tuned using a tuning capacitor to increase power transfer to the pick-up.

A problem with existing ICPT systems is control of the power transferred to pick-ups when they are lightly loaded, for example when a motor is supplied by a pick-up and is idle while it awaits a command from a control system. A solution to this control problem is the use of a shorting switch across the pick-up coil to decouple the pick-up when required and thus prevent flow of power from the primary conductive path to the pick-up. This approach is described in the specification of U.S. Pat. No. 5,293,308 assigned to Auckland UniServices Limited. However, although that specification addresses the control problem of lightly loaded pick-ups, the shorting switch causes large conduction losses, especially at light loads because it is nearly always conducting in light load conditions.

Another problem with ICPT systems is variation in the frequency of the current in the primary path. Frequency drift can cause the primary path current to fluctuate which causes problems with control of power transferred to the pick-ups. More importantly, frequency drift can significantly affect the tuning of pick-ups, especially those that use fixed frequency tuning. This reduces the ability of the system to effectively transfer power. Frequency drift can be caused by many factors. The most obvious is load change, but circuit parameter variations can also be significant.

One approach to compensate for frequency variations in the primary conductive path caused by load changes is to provide a plurality of individual capacitors and switch individual capacitors into or out of the primary power supply circuit. This approach has been posed in recently published United States patent application US2003/0210106. This has disadvantages in high Q systems because many capacitors are required. Also, load variations have to be limited to make the system function effectively.

Another approach is to use a more complex power supply, such as a third-generation (G3) supply, for the primary conductive path. This is expensive and such power supplies are not suited to miniaturisation.

BRIEF SUMMARY OF THE INVENTION

It is an object of the present invention to provide a method of controlling, or apparatus for, an ICPT power supply which will ameliorate one or more of the disadvantages suffered by existing systems, or which will at least provide the public with a useful alternative.

Accordingly in one aspect the invention provides An ICPT pick-up having a pick-up resonant circuit including a capacitive element and an inductive element adapted to receive power from a magnetic field associated with a primary conductive path to supply a load, sensing means to sense a condition of the load, and control means to selectively tune or de-tune the pick-up in response to the load sensed by the sensing means by varying the effective capacitance or inductance of the pick-up circuit to control the transfer of power to the pick-up dependant on the sensed load condition.

The control means may include a reactive element and a switching means to allow the reactive element to be selectively electrically connected to the pick-up circuit. The control means is preferably operable to control the switching means so that the apparent capacitance or inductance of the reactive element is varied to thereby tune or detune the pick-up circuit.

Phase sensing means may be provided to sense the phase of a voltage or current in the resonant circuit whereby the control means may actuate the switching means to allow the reactive element to be electrically connected to or disconnected from the resonant circuit dependant on the sensed phase.

The reactive element may comprise an inductor, and the phase sensing means can sense a voltage in the resonant circuit and the switch control means is operable to switch the second switching means to electrically connect or disconnect the inductor to or from the resonant circuit a predetermined time period after a sensed voltage zero crossing.

The reactive element may alternatively comprise a capacitor, and the phase sensing means can sense a voltage in the resonant circuit and the switch control means is operable to switch the second switching means to electrically connect or disconnect the inductor to or from the resonant circuit a predetermined time period after a sensed voltage zero crossing.

Frequency sensing means are preferably provided to sense the frequency of the resonant circuit. This may allow the control means may actuate the switch means to allow the reactive element to be electrically connected to or disconnected from the resonant circuit dependent on the sensed frequency to alter the natural resonant frequency of the resonant circuit.

The phase sensing means may also sense the frequency of the resonant circuit.

The control means may actuate the switch means to allow the reactive element to be electrically connected to or disconnected from the resonant circuit dependant on the sensed frequency to alter the natural resonant frequency of the resonant circuit.

Where the reactive element comprises an inductor, the control means is adapted to activate the second switching means to connect the inductor to the resonant circuit after the predetermined time period following a voltage zero crossing has elapsed, and allow the second switching means to be deactivated when the voltage again reaches substantially zero. The control means is capable of varying the predetermined time period between substantially 0 electrical degrees and substantially 180 electrical degrees, and most preferably between substantially 90 electrical degrees and substantially 150 electrical degrees.

Where the reactive element comprises an capacitor, the control means is adapted to activate the second switching means to disconnect the capacitor from the resonant circuit after the predetermined time period following a voltage zero crossing has elapsed. The control means is capable of varying the predetermined time period between substantially 0 electrical degrees and substantially 90 electrical degrees.

In a further aspect the invention provides An ICPT system including:
 a. A power supply comprising a resonant converter to provide alternating current to a primary conductive path of the ICPT system;
 b. One or more secondary pick-ups, each pick-up having a pick-up resonant circuit including a capacitive element and an inductive element adapted to receive power from a magnetic field associated with a primary conductive path to supply a load, sensing means to sense a condition of the load, and control means to selectively tune or de-tune the pick-up in response to the load sensed by the sensing means by varying the effective capacitance or inductance of the pick-up circuit to control the transfer of power to the pick-up dependant on the sensed load condition.

The primary conductive path comprises one or more turns of electrically conductive material, and may be provided beneath a substantially planar surface.

The primary conductive path may include at least one region about which there is a greater magnetic field strength than one or more other regions of the path. The path may achieve this by having one or more lumped inductances or one or more distributed inductances.

In a preferred embodiment the primary conductive path is mounted adjacent to an amorphous magnetic material to provide a desired magnetic flux path.

The pick-up may also include an amorphous magnetic material adjacent to the pick-up coil to provide a desired magnetic flux path.

In a still further aspect the invention provides a method for controlling power drawn by an ICPT pick-up, the method including the steps of sensing a load condition of the pick-up, and selectively tuning or detuning the pick-up circuit depending upon the sensed load condition.

The step of tuning or detuning the pickup circuit preferably includes moving the resonant frequency of the pick-up circuit toward or away from a tuned condition. This is most preferably achieved by controlling a variable capacitor or inductor.

The method may include the step of sensing the frequency of a current or voltage in the resonant circuit. The sensed frequency may then be compared with a nominal frequency for the resonant circuit and tuning or de-tuning toward or away from the nominal frequency dependant on the sensed load.

The reactive element may be selectively switched into or out of the resonant circuit to alter the apparent inductance or capacitance of the reactive element to thereby tune or de-tune the resonant circuit.

In a preferred embodiment the method includes sensing the phase of a voltage or current in the resonant circuit and electrically connecting or disconnecting the reactive element to or from the resonant circuit dependant on the sensed phase. The reactive element may be electrically connected to the resonant circuit a predetermined time period after a sensed voltage zero crossing.

The method may include sensing the frequency of the resonant circuit activating a switching means to electrically connect or disconnect the reactive element to or from the resonant circuit dependant on the sensed frequency to alter the natural resonant frequency of the resonant circuit.

The sensed frequency may be compared with a nominal frequency to allow variation of the predetermined time period to tune the resonant circuit toward or away from the nominal frequency.

If the reactive element comprises an inductor, then the method may include activating a switching means to connect the reactive element to the resonant circuit after the predetermined time period following a voltage zero crossing has elapsed, and allowing the second switching means to be deactivated when the voltage again reaches substantially zero. The predetermined time period is preferably selected from a range between substantially 0 electrical degrees and substantially 180 electrical degrees, and most preferably from a range between substantially 90 electrical degrees and substantially 150 electrical degrees.

If the reactive element comprises a capacitor, then the method may include activating a switching means to electrically disconnecting the reactive element from the resonant circuit a predetermined time period after a sensed voltage zero crossing. The predetermined time period is preferably selected from a range between substantially 0 electrical degrees and substantially 90 electrical degrees.

The invention may also broadly consist in any new part feature or element disclosed herein, or any new combination of such parts, features or elements.

DRAWING DESCRIPTION

Figure 2:
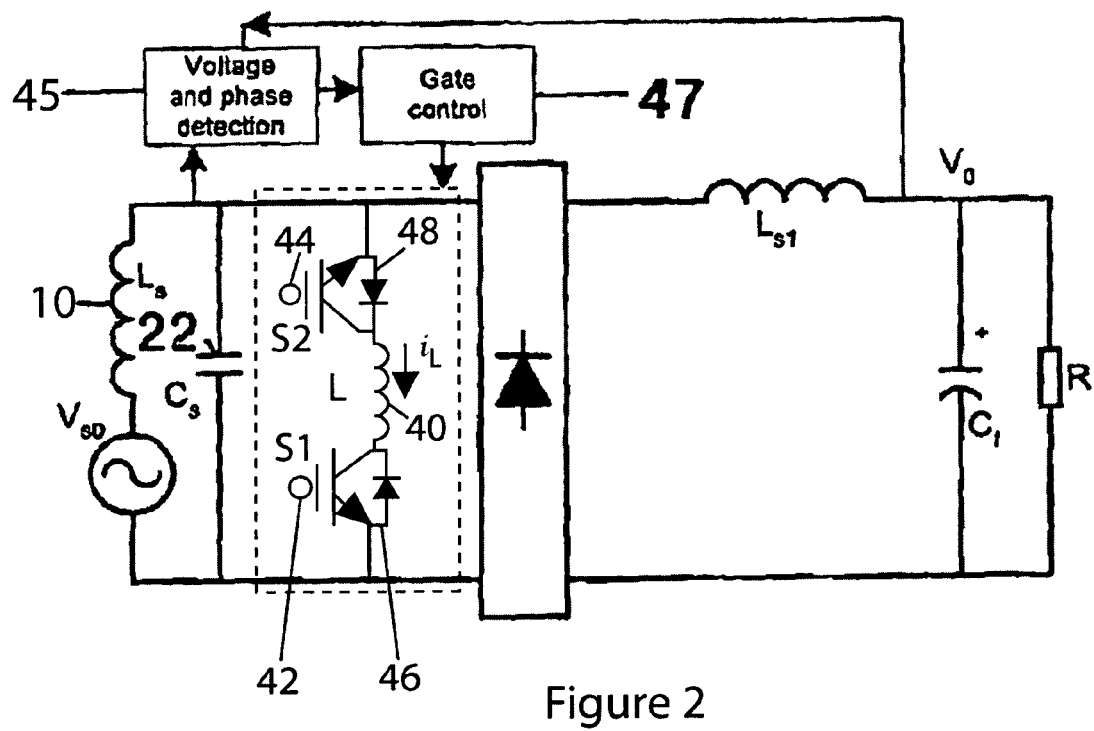
Figure 3A:
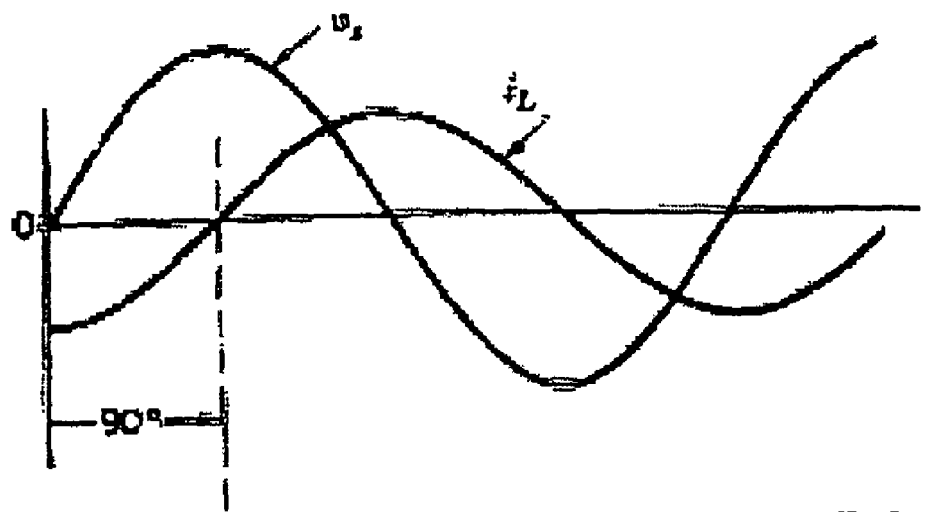
Figure 3B:
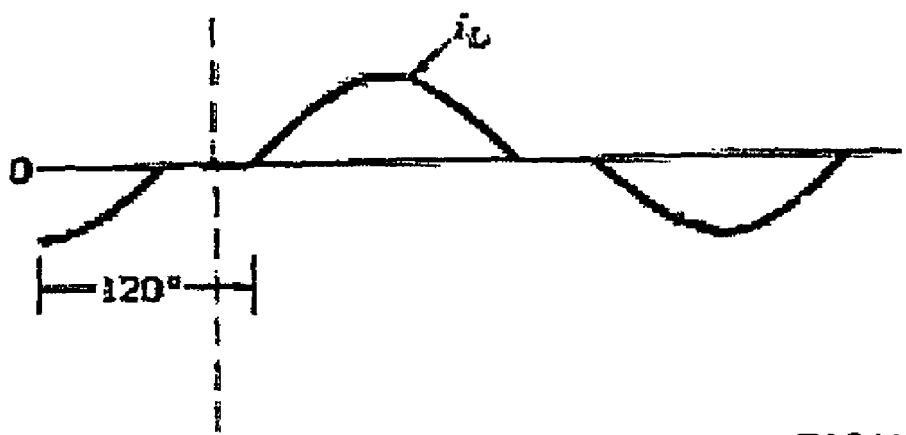
Figure 3C:
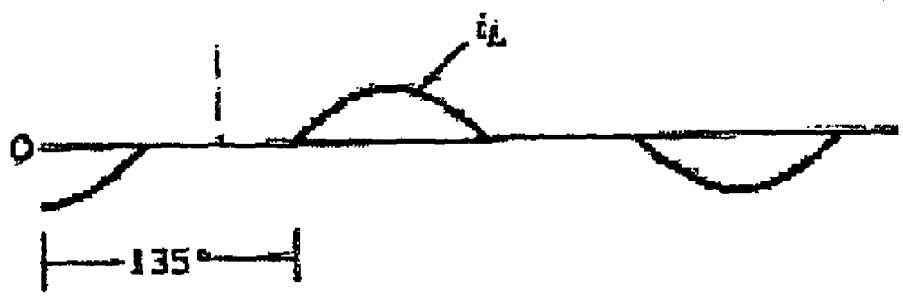
Figure 4:
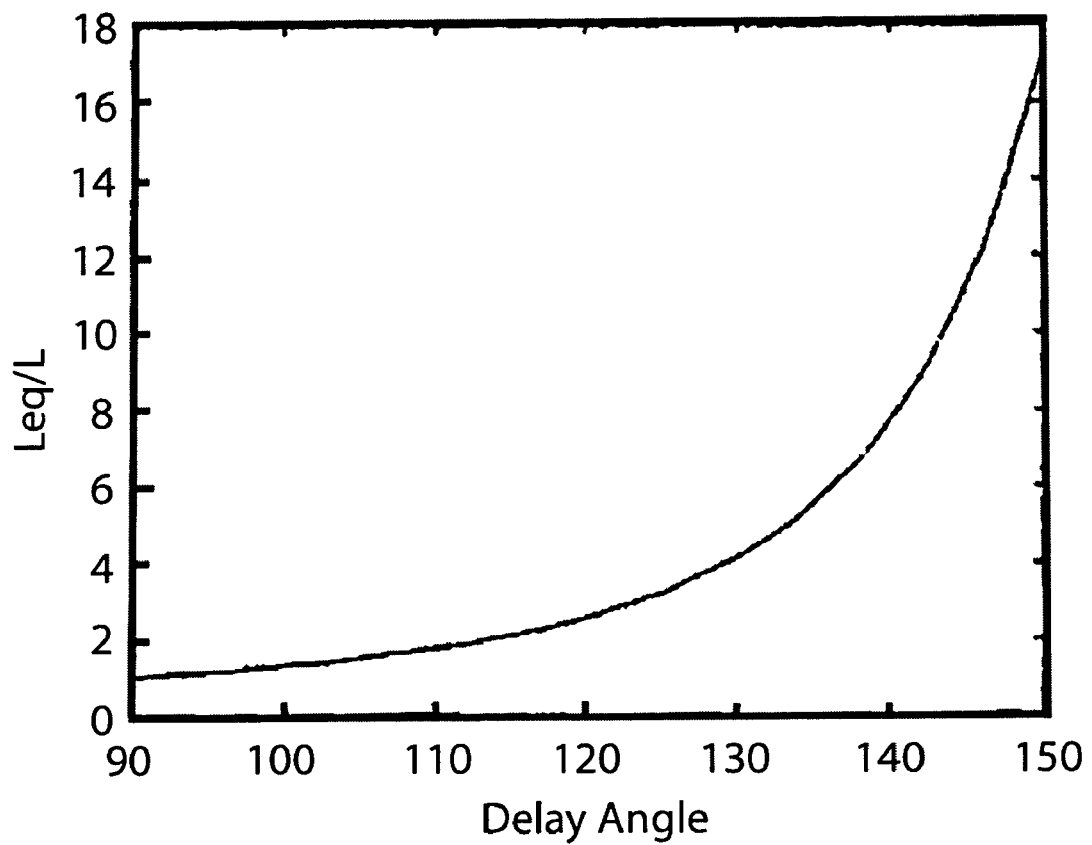
Figure 5:
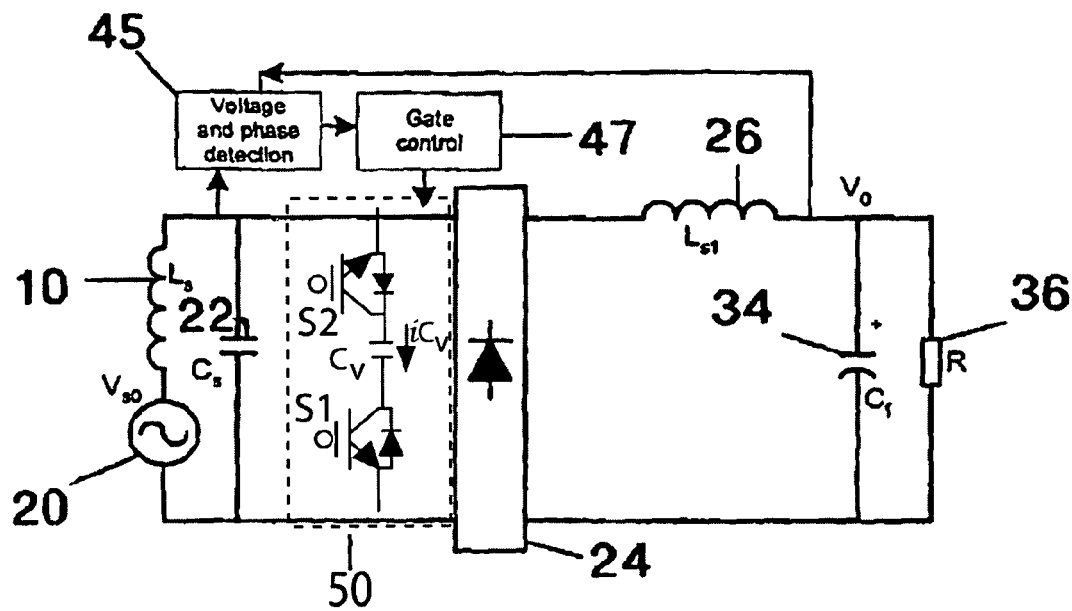
Figure 6:
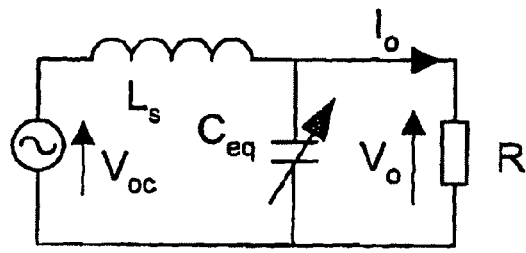
Figure 7:
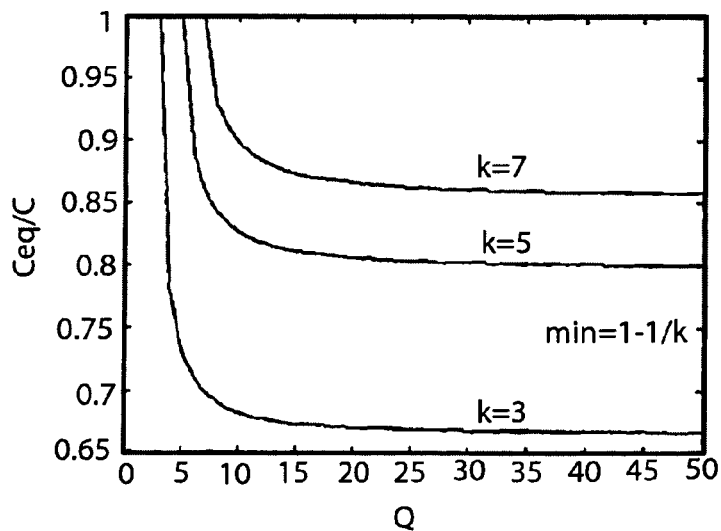
Figure 8A:
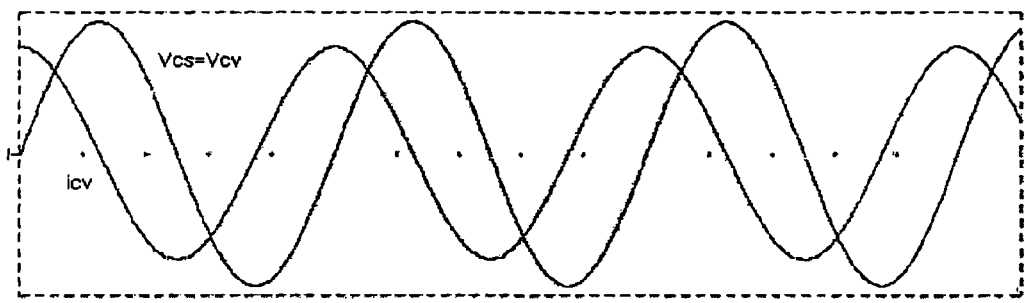
Figure 8B:
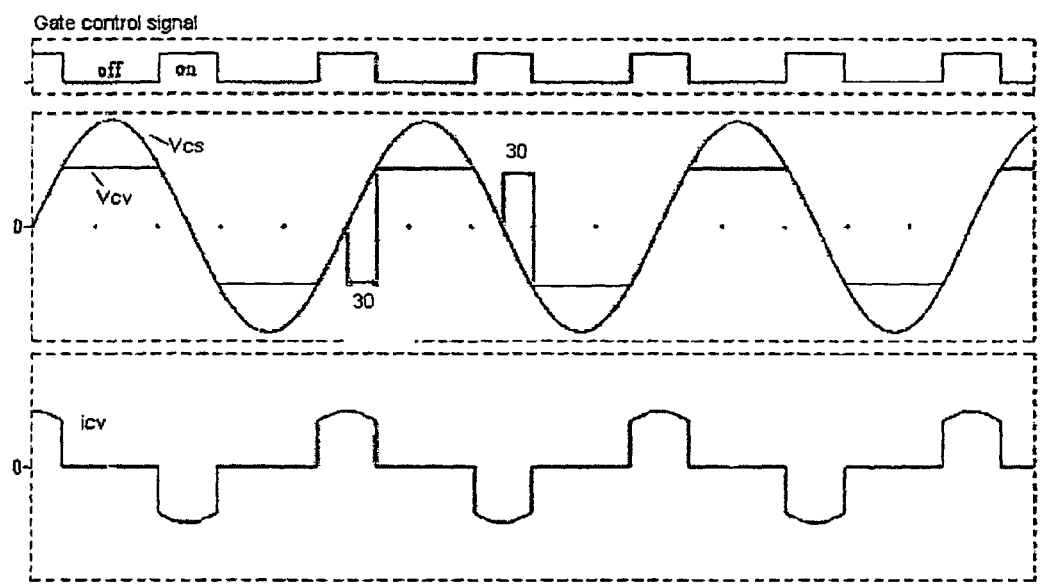
Figure 9:
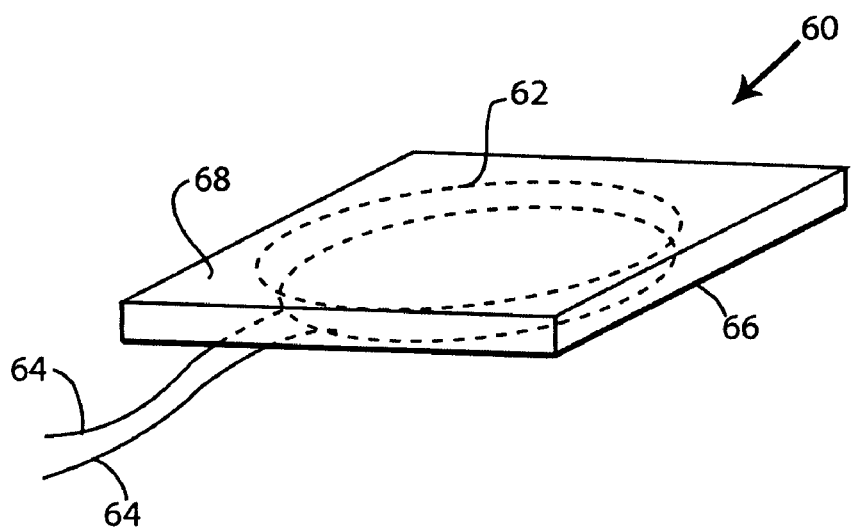
Figure 10:
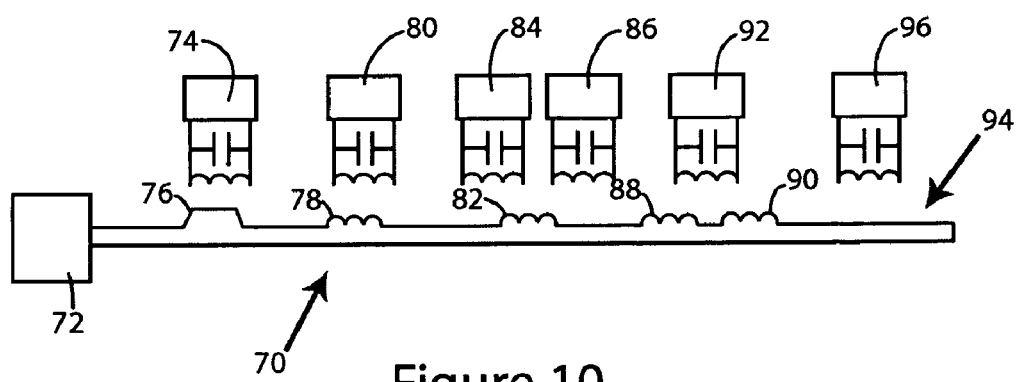

One or more examples of an embodiment of the invention will be described below with reference to the accompanying drawing in which:

FIG. 1 is a diagram of the basic structure of a known ICPT system,

FIG. 2 is a diagram of a pick-up circuit topology including a variable inductor for an ICPT power supply, FIG. 3a-3c show current waveforms of the controlled inductor of FIG. 2 with reference to the pick-up coil voltage, FIG. 4 is a plot of equivalent inductance change against delay angle for the controlled inductor of FIG. 2, FIG. 5 is a diagram of a pick-up circuit topology including a variable capacitor for an ICPT power supply, FIG. 6 is a simplified circuit diagram of the circuit of FIG. 5, FIG. 7 is a graph of equivalent capacitance against Q factor for the circuit of FIG. 6, FIGS. 8a-8b show the voltage and current waveforms relating to the controlled variable capacitor of FIG. 5, FIG. 9 is a perspective view of a device including a lumped primary conductive path of an ICPT system, FIG. 10 is a diagram of a form of primary conductive path for an ICPT system.

DETAILED DESCRIPTION OF PREFERRED EMBODIMENTS

Referring to FIG. 1, the basic structure of an ICPT power supply (also known as a contactless power supply) system is shown. The system generally comprises two electrically isolated parts. The first part consists of a power supply such as a resonant converter 2 which has inputs 4) for connection to a source of electrical energy, in this example the inputs 4 may be connected to a 50 Hertz mains supply. The first part also includes a primary conductive path 6 which is supplied with alternating current from the resonant converter 2. The primary conductive path 6 is usually in the form of an elongated "track" along which one or more of the second parts are located. In this example, the main function of the converter is to supply a nominally constant high frequency AC current of about 20 amps rms at 40 kHz with a sinusoidal waveform in the track loop.

The second part consists of one or more pick-ups 8, each of which includes a pick-up conductive element which is usually in the form of a coil 10. The pick-up also includes a controller 12 to control the transfer of power from the track loop to the pick-up. The power is supplied to a load 14. In this example the controller 12 comprises a microcomputer to control the pick-up circuit in accordance with the invention, as will be described further below. Also, in this example, the load 14 may comprise a sensor such as a fast moving sensor. One example of such a sensor is a camera which may be required to travel the length of the track loop 6 rapidly in order to provide information for implementation of a control system or process in an industrial environment.

Due to the mutual magnetic coupling between the primary conductive path 6 and the secondary pick-up coil 10, an electromotive force is induced in the pick-up coil 10. This voltage then becomes the source for the secondary power supply. Since then magnetic coupling is very loose compared to normal closely coupled transformers, the induced voltage is usually unsuitable for direct use. As such, a control mechanism is necessary to regulate the power in the form required by the load 14. In the fast moving sensor example discussed with reference to FIG. 1, the output of the pick-up required by the sensor is normally 24 volts DC. More information about the operation and design of ICPT systems is described in the specification of U.S. Pat. No. 5,293,308 (Boys), assigned to Auckland UniServices Limited.

An example of a pick-up topology according to one embodiment of the invention is shown in FIG. 2. This embodiment includes a variable inductor. The topology in FIG. 2 is a parallel tuned pick-up i.e. the tuning capacitor 22 is connected in parallel with the pick-up coil 10. The variable inductor 40 is also connected in parallel with the pick-up coil and the tuning capacitor. Alternatively, the pick-up coil could be used in accordance with the invention to provide the variable inductance.

In FIG. 2, the detuning element comprises an inductance 40 with two switches 42 and (44) with appropriate drivers (not shown) to control the voltage or current flowing through the reactive component, We have found that we can use fast semiconductor switches such as MOSFET's, IGBT's, MCT's or BJT's for example to control an inductor in such a manner that a variable inductance is provided in the pick-up circuit. Fast switches are necessary with the high frequencies (10-100 KHZ) used in ICPT power systems. However these switches are DC switches having only unidirectional current flow control. To accommodate alternating currents, two such DC switches may be used represented by switches 42 and 44 in FIG. 2. Those skilled in the art will realise that another embodiment could use an appropriate single switch, rather than two switches.

Each of the switches 42 and 44 has associated anti-parallel diodes 46 and 48 respectively, which allow the alternating inductor current to flow in both directions. Thus the inductor 40 can be controlled to selectively tune or detune the circuit dependant on the magnitude of the load. Under normal loading conditions the inductor can be switched "off" so that the pick-up circuit is tuned back again to transfer the required power.

The switches 42 and 44 are controlled dependant on the current in the pick-up resonant circuit such that the inductor 40 is phase controlled. The switches 42 and 44 are initially controlled by both being turned on. This allows the inductor current to increase gradually in one direction, depending on the direction of the applied voltage. Therefore, zero current switching (ZCS) turning on is essentially achieved. In order to achieve zero current switching when turning off, the inductor current is detected by detection means using a toroidal current transformers (Green A. and Boys J. T., "10 kHz inductively coupled power transfer-concept and control", IEE Power Electronics and Variable Speed Drives Conference, Pub 399, pp. 694-699, 1994, the contents of which are incorporated here in by reference), or other high frequency current sensors, and a switch is only turned "off" when its anti-parallel diode is conducting. In this way, each switch 42 or 44 is not only switched at zero current but also at approximately zero voltage conditions (only the diode voltage drop of about one volt). Therefore the switching losses are significantly reduced and the conduction losses introduced in the phase controlled inductor are negligible.

Therefore, the tuning capacitor Cs is chosen to provide a pick-up tuned to a particular supply frequency for the primary conductive path. The equivalent inductance of the phase controlled inductor 40 can be controlled by switches 42 and 44 to increase or decrease the overall or effective inductance of the tuned pick-up circuit, and thus vary the resonant frequency of the circuit. In this way, the pick-up can be detuned away from resonance (i.e. at the track frequency) when the load is light and does not need high power to be transferred through the pick-up circuit. Similarly, the pick-up can be tuned toward the track frequency as the load increases and high power transfer is required to satisfy the demand from the increased load. The load change can be simply detected by sensing the output voltage V0 because this voltage will drop if not enough power is supplied as disclosed in Boys (U.S. Pat. No. 5,293,308). The phase of the resonant AC voltage across Cs is also detected using the detection means 45 before the information is passed to the gate drive controller 47.

We have found an adequate range of control may be achieved with a phase controlled inductor 40 using an inductor that is approximately five times the magnitude of the inductance of the pick-up coil 10.

Referring to FIGS. 3a to 3c, typical current wave forms for the inductor current $I_L$ with reference to the pick-up coil output voltage Vo are shown. The magnitude of the inductor current is dependent on the switch activation phase delay angle. The phase of the voltage source Vo is detected, for example by using a zero-crossing detector. The phase delay angle for switch activation in the following examples is measured from the detection of a Vo zero crossing. When the delay angles are between 0° and 90°, as shown in FIG. 3a, the current is continuous so the maximum current flows through the inductor. When the delay angle is between 90° and 180°, the inductor current is discontinuous. The magnitude of the fundamental current $I_{L1}$ flowing in the inductor reduces as the delay angle is increased. This is shown in FIGS. 3b and 3c where the delay angle is 120° and 135° respectively. The magnitude of the fundamental current $I_{L1}$ is determined by:

$$I_{L1} = \frac{V_s}{\pi \omega L}(2\pi - 2\alpha + \sin 2\alpha)$$

where $$(\pi/2 \le \alpha \le \pi).$$

If the harmonic components are ignored, the equivalent inductance of the phase controlled inductor would be:

$$L_{eq} = \frac{V_s}{\omega I_{L1}} = \frac{\pi}{2\pi - 2\alpha \sin 2\alpha} L$$

Turning to FIG. 4, the relationship between the ratio of the apparent or equivalent inductance to the actual inductance, and the delay angle, is shown. The equivalent inductance of the controlled inductor is equal to its self-inductance (i.e. the ratio is 1) when the delay angle is 90°. The equivalent inductance increases with corresponding increases in the delay angle.

In theory, if the delay angles are increased to 180° or more, the inductor current would be zero, i.e. the equivalent inductance would be infinity. This is because the active switches will not be able to conduct since the applied voltage is negative. In practice, when the delay angles approach 180°, the equivalent inductance increases very sharply. This makes it unsuitable for a practical controller design. Also, at high delay angles, the harmonic components become larger compared to the fundamental current because of the large discontinuous period. As a consequence, the equation above becomes less accurate in calculating the equivalent inductance with increasing delay angles.

Therefore, for a practical regulated design we have found that control may be achieved by controlling the phase delay angle between approximately 90° and approximately 150°, since we have found that a delay angle over 150° is essentially equivalent to switching off the inductor. Control of the phase angle provides a predetermined time period in each half cycle before the variable inductor is electrically connected to the remainder of the circuit.

Thus with the circuit shown in FIG. 2, the variable inductor is controlled so that when the delay angle is at 90° or less the inductor is completely "on" and the frequency of the system is at the high end of the available range. This is because the inductor cancels some capacitance of the tuning capacitor so the total equivalent capacitance reduces, resulting in a higher resonant frequency. On the contrary, when the delay angle is close to or over 180°, the inductor is effectively switched off so that the operating frequency of the system is at the lower end of the available range. As mentioned above, we have found that in practice when a delay angle is close to or over 150°, then the inductor is effectively switched off, so in practical circumstances 150° delay effectively defines the other end of the operating frequency range. Between 90° and 180° (practically 90° to 150°) delay the inductance is controlled smoothly so that the operating frequency can be stabilised to its nominal value. Therefore, as the load changes (and any of the other factors that affect frequency shift), begin to affect the frequency, the variable inductor can be controlled by the switches S1 and S2 (FIG. 2) to change the delay angle and thus alter the natural frequency of the resonant circuit. In this way, the pick-up can be tuned to the frequency of the primary conductive path, or de-tuned away from that frequency if necessary to reduce power transfer to the pick-up when this is not required by the load. The control mechanism is shown diagrammatically in FIG. 2 by phase detection unit 45 (which may comprise a zero-crossing detector) to detect zero crossings of the resonant circuit voltage and the direction of such crossings, or at least whether the voltage waveform is in the positive or negative half cycle. This information is supplied to the switch control unit 47. The zero crossing detection also provides a measurement of the frequency of the resonant circuit. Alternatively, this may be measured by another means or by a separate circuit. The information is supplied to control unit 47 (which may include a microprocessor) for controlling the switches (S1 and S2 in FIG. 2) across the variable inductor L to ensure that the effective inductance of the variable inductor is varied to tune or de-tune the natural resonant frequency of the pick-up resonant circuit toward or away from the nominal frequency of the system (i.e. the frequency of the supply to the primary conductive path).

This control strategy may be implemented in such a way that the pick-up is tuned or detuned simply dependant on the load (for example by monitoring the output voltage Vo). Thus the pick-up can be dynamically tuned or detuned toward or away from the frequency that the primary conductive path is operating at. This means that the frequency of the current in the primary path is not as critical for adequate performance as it is with known systems. Whatever the track frequency happens to be, the present invention can tune to that frequency if required to obtain maximum power transfer (or the power transfer required by the load at any given time) to the pick-up.

A further advantage with the invention is that the shorting switch and diode of the known pick-up circuit topology disclosed in the Boys specification (U.S. Pat. No. 5,293,308) are not required.

Rather than using a variable inductance, a variable capacitance may be used as shown in FIG. 5. Referring to that Figure, circuit elements that are the same as or similar to those described above are labelled using the same reference numerals. As can be seen, the difference with respect to FIG. 2 is the use of a variable capacitance 50 rather than a variable inductance. Similarly to the variable inductor control, the variable capacitance preferably comprises a capacitor connected across tuning capacitor 22 via two switching elements, although only one switch may be used to achieved simplified half waveform control. Therefore, the switches may be controlled to control the equivalent capacitance of the variable capacitor, and thus tune or detune the pick-up as described above in relation to FIG. 2. Again, the tuning capacitor 22 may be used alone to provide the variable capacitor.

If a circuit in which a variable capacitance is arranged in parallel with the tuning capacitor 22 is used (such as the topology shown in FIG. 5), then capacitor 22 may be selected to be approximately one half of the capacitance required, or any other percentage of the total capacitance depending on the load variation range, to provide resonance at the intended primary current frequency. The variable capacitor may also comprise a capacitor of the same magnitude (i.e. one half of the capacitance required to provide resonance at the intended primary current frequency). This allows an adequate range of capacitance to be provided to allow reasonable control.

A simplified equivalent circuit to that shown in FIG. 5 is set forth in FIG. 6 and may be used to assist with the following theoretical analysis.

Ideally for a simplified model as shown in FIG. 6, to maintain the output voltage Vo constant without shorting the shunt switch S in the steady state, the capacitance should be detuned according to:

$$C_{eq} = C_s \left(1 - \frac{1}{Q}\sqrt{(Q/k)^2 - 1}\right) \qquad (1)$$

Where Cs is the original tuning capacitance (22), Q (=R/$\omega L_s$) is the quality factor which reflects the load change, and k is the actual required boost up factor from the open circuit voltage $V_{oc}$ to the output voltage Vo, ie, k=$V_o/V_{oc}$.

From Eqn (1) the relationship between the load change (in terms of Q) and tuning capacitor (with respect to the original tuning capacitor) is calculated and shown in FIG. 7.

From FIG. 7 it can be seen that under detuned condition, Q must be larger than k in order to keep the output voltage constant. If there is no load, Q would be infinity. To keep k (and thus the output voltage Vo) constant against the load change, Ceq is tuned dynamically. The minimum capacitor is determined by:

$$C_{eq} = \lim_{Q \to \infty} C_s \left(1 - \frac{1}{Q}\sqrt{(Q/k)^2 - 1}\right) = C_s(1 - 1/k) \qquad (2)$$

It is clear that the larger the voltage boost factor k needed, the smaller the capacitor tuning ratio that is required. This is because the circuit becomes more sensitive to the load change when the boosting factor is high. Such a property is desirable for minimising the power pick-up size as the open circuit voltage can be lower.

FIGS. 8a and 8b show typical voltage and current waveforms of the controlled variable capacitor. Referring to FIG. 5, when the two switches S1 and S2 are always on, corresponding to the situation when the control phase angle (with reference to switching off) is zero electrical degrees, the current would be 90 electrical degrees leading the total resonant voltage across the two capacitors, as shown in FIG. 8a. When the phase angle is controlled between 0-90 degrees, capacitor Cv will be disconnected for a period. For example, FIG. 8b shows waveform is for the date (which) control signal, the voltage across Cv (Vcv), the voltage across Cs (Vcs), and the current through Cv (icv) for the situation when the phase angle is about 30 degrees. When the switches are off, the voltage across Cv is kept constant and its current is zero. When the switches are controlled to be on, its voltage is equal to the total resonant voltage and a current flows through capacitor Cv. The phase angle provides a controllable predetermined time period before which disconnection occurs. If the phase angle is equal to or over 90 degrees, the capacitor is essentially off all the time. Therefore, by controlling the phase angle, the conduction period of the capacitor Cv is controlled, so the effective capacitance varies between 0 and its maximum value.

Therefore, as described above with reference to the variable inductor, the effective capacitance of the variable capacitor may be varied to tune or de-tune the natural resonant frequency of the pick-up resonant circuit toward or away from the nominal frequency of the system (i.e. the frequency of the supply to the primary conductive path).

A dynamic power control circuit for contactless power supply applications has been proposed. This has been achieved by introducing a variable switched capacitor or inductor into the secondary resonant circuits of ICPT power supply systems.

The invention allows an improved ICPT supply system since pick-ups according to the invention may be used in conjunction with a known (poor frequency regulated) primary supply. Furthermore, the invention improves pick-up efficiency.

There are a wide variety of applications for the invention including delivery of electrical energy to a variety of loads, including sensors, in environments where traditional conductive paths are undesirable. Examples include production facilities in clean room environments, moving apparatus such as fast-moving sensors (e.g. robots, optical sensors), battery charging or recharging, forestry (e.g. sensors), bio-implants, underwater (i.e. waterproofing requirements), dangerous (e.g. explosive environments) and mining environments (e.g. lights, sensors), where traditional conductive elements are not safe, inconvenient or experience excessive wear.

As another example, the invention may be used to wirelessly power, charge or recharge desktop equipment such as mobile computing devices and mobile communication devices. A primary conductive path according to the invention can be provided in a mouse pad or in or under a desk top or work surface. A pick-up according to the invention may be provided in a mouse, mobile phone or laptop computer so that the pick-up can be used to transfer power to the device for operation of the device and/or for charging a battery in the device. A problem with placing the primary conductive path in an environment where it may be used to charge multiple devices (e.g. a mouse and a mobile telephone and perhaps also a computer) is that the load may vary considerably dependent on how many devices are powered and how close they are to the conductive path. Extraneous load factors such as the placement of nearby metal objects may also create significant load variations. The present invention overcomes these problems by allowing a tuned pick-up to be provided which can compensate for load variations to allow required performance to be achieved.

Pick-up units according to the invention may be provided for attachment to various devices such as a mobile phone, a personal digital assistant, or a notebook or laptop computer. For example, a pickup unit may be provided in the form of a "cradle" which engages with a personal digital assistant, the cradle having an electrical connector which connects to a charging port on the personal digital assistant or other computer. Similarly, a pickup may be provided at a unit which is attached to the base of laptop computer, or the base of another device such as a cellular telephone and connects with a charging port of the relevant device. In this way, the pickup unit may be used with existing electrical devices. Alternatively, pickup unit may be incorporated directly into devices during manufacture.

The pickup coil for each pickup unit is preferably provided adjacent to an amorphous magnetic material. For example, in one embodiment the pickup coil may comprise a conductor such as copper wire wound about a substantially flat ferrite core. In this way an improved flux path is provided to guide magnetic flux in the vicinity of the pickup coil and improve the coupling between the primary conductive path and the pickup coil. Alternatively the coil may be etched as one or more tracks on a printed circuit board for example with an amorphous material such as a ferrite core attached to the board. The electronic components required to implement the pickup system apart from the coil may be provided in a very small space, so the pickup may be physically and limited in considerably small unit for incorporation into existing electronic devices such as those described above, or for attachment to such devices.

Since the resonant or tank circuit of the pick-up can be selectively tuned or detuned, the invention may be of implemented in loosely or closely coupled systems. Furthermore, may supply battery free loads, or maybe used to recharge batteries. In some applications, for example bio-implants, a pick-up may include a super-capacitor which can be charged or energised by the pick-up.

With relevance to ICPT systems, the invention may be used to receive energy from a primary conductive path that may take a variety of different forms. For example, referring FIG. 8, a generally planar housing 60 is shown, within which a conductor 62 is disposed. As can be seen from the drawing, the conductor 36 may be provided in the form of a loop or coil of conductive material. In the most preferred embodiment, a number of turns of conductive material are provided and the conductor connection cables 64 exit the unit at an appropriate location to be connected to a power supply including a converter as described in one or more of the foregoing embodiments. If desired, the cables 64 may terminate in a plug or socket for electrical connection with a corresponding socket or plug associated with the power supply. Alternatively, although not shown, the converter may be provided within the housing. Therefore, the housing may include external conductors for connection to a mains alternating current power supply, and a converter within the housing may rectify and filter the mains supply to provide an appropriate DC source which the converter then switches across the resonant circuit to provide the required AC supply for the conductor 62.

In the preferred embodiment, the pad 60 may comprise a pad which is commonly used for a "point and click" device such as a mouse, or could comprise part of a desktop surface or similar surfaces. For example, the housing 60 may be provided as part of a food tray or work surface (such as a folding food tray) in a vehicle such as an aircraft, train, bus or the like. Housing 60 could also be part of stone seats, wall tiles (used for heating) or towel rails (used for drying) in spas, saunas, bathrooms etc. it could be also used for animal cages to provide power to implants inside the animals such as rabbits, mice etc. The body of the housing is preferably constructed from a nonconductive material, but may include amorphous magnetic material 36 in one or more parts of the apparatus or in the apparatus as a whole. Such material can an provide appropriate flux path(s) so that secondary devices may be placed in the vicinity of the housing 60, most preferably on the surface 68 of the housing, and be powered by mutual induction from the coil 62. Housing 60 can also work underwater.

Apparatus which may include secondary pickup devices for use in conjunction with the housing 60 may include a variety of devices which would normally be powered by one or more batteries, but may also include other devices for which it is convenient to have cordless operation. Such devices may include "point and click" devices (e.g. a mouse), cellular telephone devices, PDA's, notebooks or laptops, electric toothbrushes, electric shavers etc.

These devices may include rechargeable cells or batteries of cells which the pickup recharges by power which is induced in the pickup coil from coil 62. Alternatively, the devices (e.g. a mouse) may not require a battery as such because the device is only used in the vicinity of coil 62. Therefore the supply may be used to power battery and non-battery equipped pick-ups.

Furthermore, the unit 60 may alternatively or in addition to conductor 62 include specific region for location of a device to which energy is to be supplied. For example, one or more ferrite cores may be provided within the unit 60 with various markings on the upper surface 68 to indicate where a power receiving device should be placed. The upper surface 68 may be formed or contoured (for example by being appropriately moulded) to receive or accommodate the power receiving device. Therefore the invention is to applicable to both loosely and closely coupled systems. The pick-up provided by the invention allows this flexibility because the variations in load that occur as a result of coupling strength and which affect the supply frequency of the primary conductive path can be accommodated by each pick-up.

The use of the invention has the advantage that a number of different devices may be placed on housing 60 to be powered by the coil 62. These multiple devices, which increase the load on the power supply, would normally tend to affect the power supply frequency. However, the dynamic tank circuit tuning provided by the invention means that multiple loads or changes in load do not affect system performance.

Those skilled in the art will appreciate that the primary conductive path 62 within housing 60 may take a variety of different forms. In particular, a separate housing as such is not required. In some circumstances all that may be required is a conductor 62 which is provided in or on an underside of an appropriate surface such as a desktop for example. Also, rather than having the primary conductor arranged as a coil, a number of different configurations are possible. For example, a conductive path may be etched or printed on appropriate substrates such as a printed circuit board and the conductive path(s) may be arranged so as to provide a desired flux path or a plurality of desired flux paths which may be stationary or moving. For example, the flux paths may be designed to pad "rotate" so that a pick-up device may be placed in a variety of different positions or orientations adjacent to conductive path 32 and still receive sufficient energy to supply the required load.

Turning to FIG. 9 another embodiment of a primary conductive path for an ICPT power supply is shown. In this embodiment, the primary conductive path is generally referenced 70, and a supplied by power supply 72 which may include a resonant converter such as a current fed push pull resonant converter.

The primary conductive path 70 may simply comprise a loop of conductive material. This material is preferably a multi-strand conductive material such as copper wire for example. However, as shown in FIG. 9, it may be preferable in applications where pickups remain stationary relative to the primary conductive path 70 for the primary conductive path to be adapted to optimise power transfer to those pick-ups. An example of use of a primary conductive path to supply pick-ups that remain stationary relative to the path includes use of an ICPT system in a boat, a swimming pool or bath, a building, or a vehicle. To take the example of a boat, the primary conductive path may be provided in the boat during manufacture. In this way, the primary conductive path remains physically and electrically isolated so as not to be prone to damage and it is hidden so it does not interfere with the appearance of the structure. Power can be delivered to pick-up devices fitted in or on the boat without requiring the integrity of the boat structure to be compromised. In particular the hull does not need to be penetrated to install equipment such as depth or speed sensors. Alternatively, the primary conductive path may be retrofitted to a boat after manufacture.

In order to facilitate power transfer from the primary conductive path on the boat to pick-ups, the primary conductive path may be modified in various predetermined positions about the boat structure. For example, in the vicinity of pickup 74 (which may comprise a navigation light for example), the conductive path may be widened at location 76 to provide an elongated or distributed region of increased magnetic field to facilitate power transfer to the pickup 74. Similarly, at location 78, one or more turns of conductive material may be included in the primary conductor (for example by looping the primary conductor) to facilitate data transfer to the pickup which may need a more significant energy requirement, for example an instrument panel that may be powered by pickup 80. Therefore a "hotspot" or region of relatively intense magnetic field strength is created. Similarly, a further "hotspot" may be provided at location 82 in the primary conductive path for powering more than one pickup, such as pickups 84 and 86. If required, more than one "hotspot" may be provided as shown by regions 88 and 90 which can power a pickup 92 that has a more significant power requirement such as a battery charging device for example. Finally, simple elongated regions of primary conductive path that are unmodified, such as region 94 can be used to supply devices that may have a low power requirement and which may need to be moved about relative to the primary conductive path. For example, the position of a navigation light supplied by pickup 96 and provided on the mast of the boat may need to be changed from time to time, so a simple length of primary conductor 94 may be provided on the mast of the boat, so that the pickup characteristic is uniform along the relevant portion of the mast.

Further applications of the invention include bioengineering applications such as implants for biological research or drug tests, waterproof applications, explosion proof applications, the mining industry (e.g. lights, sensors), the forestry industry (e.g. sensors), moving sensor applications (e.g. robots, optical sensors), heating systems (e.g. seat heating, towel drying).

As mentioned above the invention may be used to supply pick-ups that include batteries or which are battery-free. Furthermore, the pick-ups may include a super-capacitor as an energy storage device, which can be charge/discharged very quickly, and is very safe and almost maintenance free in having a long life span.

The preferred features of the invention are applicable to all aspects of the invention and may be used in any possible combination. For example, those skilled in the art will appreciate that the controlled variable reactive elements may be used in series tuned pickups or parallel tuned pick-ups. Also, the variable reactive elements may comprise the pickup coil or its tuning capacitor.

Where the words "comprise" "have" or "contain" are used in this document, or variations of these word such as comprises and comprising, these are intended to be interpreted in an inclusive sense i.e. to mean "including but not limited to" unless the context clearly dictates the contrary.

Wherein the foregoing description reference has been made to specific components or integers of the invention having known equivalents then such equivalents are herein incorporated as if individually set forth.

The invention claimed is:

1. An inductively coupled power transfer pick-up comprising:
    a pick-up resonant circuit comprising a capacitive element and an inductive element adapted to receive power from a magnetic field associated with a primary conductive path to supply a load, one of the capacitive element and the inductive element comprising a controlled reactive element;
    a phase device configured to sense the phase of a voltage or current in the pick-up resonant circuit;
    a sensor configured to sense a power requirement of the load; and
    a controller configured to selectively tune or de-tune the pick-up resonant circuit in response to the load power requirement sensed by the sensor by selectively electrically connecting or disconnecting the controlled reactive element to or from the pick-up resonant circuit in each cycle of the voltage or current dependent on the sensed phase to vary the effective capacitance or inductance of the controlled reactive element of the pick-up resonant circuit to control the transfer of power to the pick-up resonant circuit dependant on the sensed load power requirement.

2. The inductively coupled power transfer pick-up as claimed in claim 1, wherein the controlled reactive element comprises a switching device configured to allow the controlled reactive element to be selectively electrically connected to the pick-up resonant circuit.

3. The inductively coupled power transfer pick-up as claimed in claim 2, wherein the controller is operable to control the switching device so that the apparent capacitance or inductance of the controlled reactive element is varied to thereby tune or detune the pick-up resonant circuit.

4. The inductively coupled power transfer pick-up as claimed in claim 3, wherein the controlled reactive element comprises a pick-up coil or is connected in parallel with the pick-up coil.

5. The inductively coupled power transfer pick-up as claimed in claim 2,
    wherein the controller actuates the switching device to allow the controlled reactive element to be electrically connected to or disconnected from the pick-up resonant circuit dependant on the sensed phase.

6. The inductively coupled power transfer pick-up as claimed in claim 5, wherein:
    the controlled reactive element comprises an inductor,
    the phase device senses a voltage in the pick-up resonant circuit, and
    the controller is operable to switch the switching device to electrically connect or disconnect the inductor to or from the pick-up resonant circuit a predetermined time period after a sensed voltage zero crossing.

7. The inductively coupled power transfer pick-up as claimed in claim 6, wherein the controller is adapted to activate the switching device to connect the inductor to the pick-up resonant circuit after the predetermined time period following a voltage zero crossing has elapsed, and further adapted to allow the switching device to be deactivated when the voltage again reaches substantially zero.

8. The inductively coupled power transfer pick-up as claimed in claim 6, wherein the controller is capable of varying the predetermined time period between substantially 0 electrical degrees and substantially 180 electrical degrees.

9. The inductively coupled power transfer pick-up as claimed in claim 6 wherein the controller is capable of varying the predetermined time period between substantially 90 electrical degrees and substantially 150 electrical degrees.

10. The inductively coupled power transfer pick-up as claimed in claim 6 wherein the inductor is connected in parallel with a tuning capacitor of the pick-up resonant circuit.

11. The inductively coupled power transfer pick-up as claimed in claim 6, wherein the inductor comprising two terminals, and wherein the switching device comprises at least two controllable semiconductor switching elements, a respective semiconductor switching element being connected between each terminal and the pick-up resonant circuit.

12. The inductively coupled power transfer pick-up as claimed in claim 11 wherein each switching element comprises an anti-parallel diode connected thereacross.

13. The inductively coupled power transfer pick-up as claimed in claim 11 wherein the semiconductor switch elements comprises at least one of IGBT's, MOSFETS, MCT's, and BJT's.

14. The inductively coupled power transfer pick-up as claimed in claim 5, wherein:
the controlled reactive element comprises a capacitor,
the phase sensing device senses a voltage in the pick-up resonant circuit, and
the controller is operable to switch the switching device to electrically connect or disconnect the capacitor to or from the pick-up resonant circuit in a predetermined time period after a sensed voltage zero crossing.

15. The inductively coupled power transfer pick-up as claimed in claim 14, further comprising:
a frequency sensing device configured to sense the frequency of the pick-up resonant circuit, and
wherein the controller actuates the switching device to allow the capacitor to be electrically connected to or disconnected from the pick-up resonant circuit dependant on the sensed frequency to alter the natural resonant frequency of the pick-up resonant circuit.

16. The inductively coupled power transfer pick-up as claimed in claim 14, wherein:
the phase sensing device senses the frequency of the pick-up resonant circuit; and
the controller actuates the switching device to allow the capacitor to be electrically connected to or disconnected from the pick-up resonant circuit dependant on the sensed frequency to alter the natural resonant frequency of the pick-up resonant circuit.

17. The inductively coupled power transfer pick-up as claimed in claim 14 wherein the controller is adapted to activate the switching device to disconnect the capacitor from the pick-up resonant circuit after the predetermined time period following a voltage zero crossing has elapsed.

18. The inductively coupled power transfer pick-up as claimed in claim 14 wherein the controller is capable of varying the predetermined time period between substantially 0 electrical degrees and substantially 90 electrical degrees.

19. The inductively coupled power transfer pick-up as claimed in claim 14 wherein the capacitor is connected in parallel with a tuning capacitor of the pick-up resonant circuit.

20. The inductively coupled power transfer pick-up as claimed in claim 19 wherein a capacitance of the capacitor is substantially equal to a capacitance of the tuning capacitor.

21. The inductively coupled power transfer pick-up as claimed in claim 14 wherein:
the capacitor comprises two terminals, and
the switching device comprises two controllable semiconductor switching elements, a respective semiconductor switching element being connected between each terminal and the pick-up resonant circuit.

22. The inductively coupled power transfer pick-up as claimed in claim 21 wherein each switching element comprises an anti-parallel diode connected thereacross.

23. The inductively coupled power transfer pick-up as claimed in claim 21 wherein the semiconductor switch elements comprise at least one of IGBT's, MOSFETS, and BJT's.

24. The inductively coupled power transfer pick-up as claimed in claim 14, wherein the capacitor comprises the tuning capacitor of the pick-up resonant circuit.

25. The inductively coupled power transfer pick-up as claimed in claim 2, further comprising:
a frequency sensing device configured to sense the frequency of the pick-up resonant circuit whereby the controller actuates the switching device to allow the controlled reactive element to be electrically connected to or disconnected from the pick-up resonant circuit dependant on the sensed frequency to alter the natural resonant frequency of the pick-up resonant circuit.

26. The inductively coupled power transfer pick-up as claimed in claim 2, wherein:
the phase sensing device senses the frequency of the pick-up resonant circuit, and
the controller actuates the switching device to allow the controlled reactive element to be electrically connected to or disconnected from the pick-up resonant circuit dependant on the sensed frequency to alter the natural resonant frequency of the pick-up resonant circuit.

27. An inductively coupled power transfer system comprising:
a power supply comprising a resonant converter to provide alternating current to a primary conductive path of the inductively coupled power transfer system;
one or more inductively coupled power transfer system pick-up devices, each of said pick-up devices comprising a pick-up resonant circuit comprising:
a capacitive element; and
an inductive element adapted to receive power from a magnetic field associated with a primary conductive path to supply a load;
a phase device configured to sense the phase of a voltage or current in the pick-up resonant circuit;
a sensor configured to sense a power requirement of the load; and
a controller configured to selectively tune or de-tune the pick-up resonant circuit in response to the load power requirement sensed by the sensor by selectively electrically connecting or disconnecting the controlled reactive element to or from the pick-up resonant circuit in each cycle of the voltage or current dependent on the sensed phase to vary the effective capacitance or inductance of the controlled reactive element of the pick-up resonant circuit to control the transfer of power to the pick-up resonant circuit dependant on the sensed load power requirement.

28. The inductively coupled power transfer system as claimed in claim 27 wherein the primary conductive path comprises one or more turns of electrically conductive material.

29. The inductively coupled power transfer system as claimed in claim 28 wherein the primary conductive path is provided beneath a substantially planar surface.

30. The inductively coupled power transfer system as claimed in claim 27 wherein the primary conductive path comprises at least one region about which there is a greater magnetic field strength than one or more other regions of the path.

31. The inductively coupled power transfer system as claimed in claim 27 wherein the primary conductive path comprises one or more lumped inductances or one or more distributed inductances.

32. The inductively coupled power transfer system as claimed in claim 27 wherein the primary conductive path is mounted adjacent to an amorphous magnetic material to provide a desired magnetic flux path.

33. The inductively coupled power transfer system as claimed in claim 27 wherein the pick-up resonant circuit comprises an amorphous magnetic material adjacent to the pick-up coil to provide a desired magnetic flux path.

34. The inductively coupled power transfer system as claimed in claim 27 wherein the pick-up resonant circuit is battery-free.

35. The inductively coupled power transfer system as claimed in claim 27 wherein the pick-up resonant circuit comprises a super-capacitor.

36. A method for controlling power drawn by an inductively coupled power transfer pick-up, the method comprising the steps of:
sensing the phase of a voltage or current in a pick-up resonant circuit;
sensing a power requirement of a load supplied by the pick-up resonant circuit; and
selectively tuning or detuning the pick-up resonant circuit in response to the power requirement sensed by the sensor by selectively electrically connecting or disconnecting the controlled reactive element to or from the pick-up resonant circuit in each cycle of the voltage or current dependent on the sensed phase to vary the effective capacitance or inductance of a controlled reactive element of the pick-up resonant circuit to thereby control the transfer of power to the pick-up resonant circuit dependant on the sensed load power requirement.

37. A method as claimed in claim 36 wherein the step of tuning or detuning the pickup resonant circuit comprises the step of moving a resonant frequency of the pick-up resonant circuit toward or away from a tuned condition.

38. A method as claimed in claim 36 further comprising the step of sensing a frequency of a current or voltage in the pick-up resonant circuit.

39. A method as claimed in claim 38 further comprising the steps of:
comparing the sensed frequency with a nominal frequency for the pick-up resonant circuit; and
tuning or de-tuning toward or away from a nominal frequency dependant on the sensed load.

40. A method as claimed in claim 36 further comprising the step of:
selectively switching the controlled reactive element into or out of the pick-up resonant circuit to the effective inductance or capacitance of the controlled reactive element to thereby tune or de-tune the pick-up resonant circuit.

41. A method as claimed in claim 40, further comprising the steps of:
sensing a phase of a voltage; and
electrically connecting the controlled reactive element to the pick-up resonant circuit in a predetermined time period after a sensed voltage zero crossing.

42. A method as claimed in claim 40 further comprising the steps of:
sensing the frequency of the pick-up resonant circuit; and
activating a switching device to electrically connect or disconnect the controlled reactive element to or from the pick-up resonant circuit dependant on the sensed frequency to alter the natural resonant frequency of the pick-up resonant circuit.

43. A method as claimed in claim 40 further comprising the steps of:
comparing the sensed frequency with a nominal frequency; and
varying the predetermined time period to tune the pick-up resonant circuit toward or away from the nominal frequency.

44. A method as claimed in claim 40, further comprising the steps of:
activating a switching device to connect the controlled reactive element to the pick-up resonant circuit after the predetermined time period following a voltage zero crossing has elapsed; and
allowing the switching device to be deactivated when the voltage again reaches substantially zero.

45. A method as claimed in claim 40 further comprising the step of selecting the predetermined time period from a range between substantially 0 electrical degrees and substantially 180 electrical degrees.

46. A method as claimed in claim 40 further comprising the step of selecting the predetermined time period from a range between substantially 90 electrical degrees and substantially 150 electrical degrees.

47. A method as claimed in claim 40, further comprising the steps of:
sensing a phase of a voltage; and
electrically disconnecting the controlled reactive element to the pick-up resonant circuit in a predetermined time period after a sensed voltage zero crossing.

48. A method as claimed in claim 47, wherein the controlled reactive element comprises a capacitor, and the predetermined time period is selected from a range between substantially 0 electrical degrees and substantially 90 electrical degrees.

* * * * *